Jan. 18, 1949.  D. M. SMITH  2,459,395
PISTON RING
Filed May 13, 1943
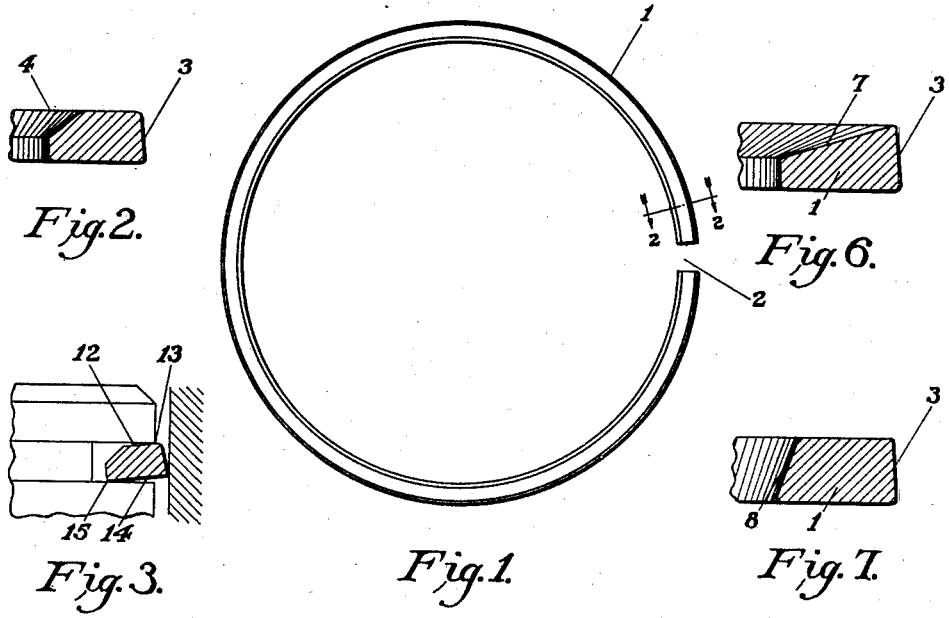
Fig. 2. Fig. 6. Fig. 3. Fig. 1. Fig. 7. Fig. 4. Fig. 5. Fig. 8.
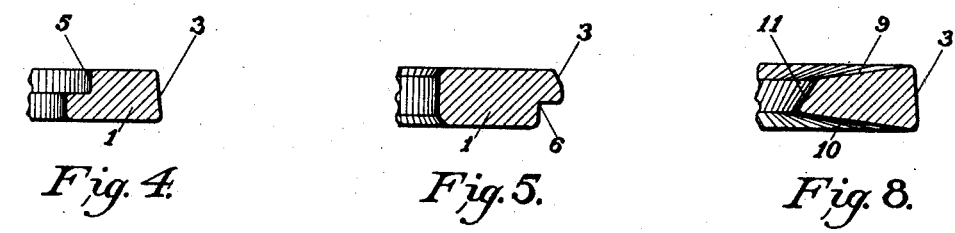
Fig. 10. Fig. 9.
INVENTOR
DALLAS M. SMITH
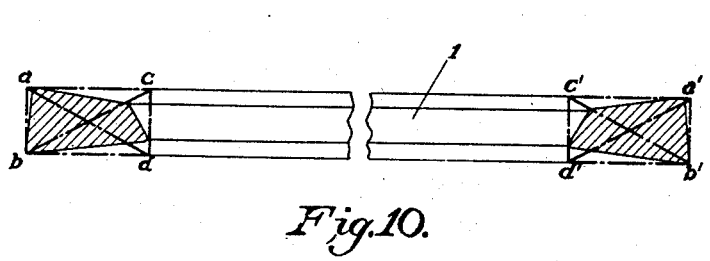
BY
ATTORNEYS Patented Jan. 18, 1949

2,459,395

UNITED STATES PATENT OFFICE 2,459,395

PISTON RING

Dallas M. Smith, Kirkwood, Mo., assignor to McQuay-Norris Manufacturing Company, St. Louis, Mo., a corporation of Delaware Application May 13, 1943, Serial No. 486,759

1 Claim. (Cl. 309—44)

This invention relates to piston rings and has particular reference to a ring which will not only control compression, i. e., minimize blow-by in an internal combustion engine, but which will also provide an effective means of scraping lubricant from the cylinder barrel thus minimizing oil consumption.

In internal combustion engines it is customary to provide a plurality of piston rings, the uppermost ring being especially adapted for the control of compression and a lower ring being particularly adapted to control oil, with intermediate rings arranged to supplement the compression or oil rings, or both. It is recognized that compression should be controlled by compression rings and oil should be controlled by oil rings but sometimes oil is controlled by the loss of compression, which is not desirable because any loss of compression or blow-by decreases the efficiency of the engine, increases the fuel consumption and the temperature of the piston ring and cylinder wall, so that control of blow-by in this manner is more detrimental than beneficial.

It is recognized, of course, that the oil ring should permit enough lubricant to remain on the cylinder wall to lubricate the surface sufficiently to insure free operation of the one or more piston rings thereabove, including the compression ring or rings.

It has long been thought that an ideal arrangement for a compression ring is one in which the cylinder engaging face is tapered so as to provide a highly loaded scraping edge at the lower side of the face of the ring; and while efforts have been made to provide piston rings with such tapered faces, their performance has been disappointing. For while the theory of such a ring seemed to be correct and in practice it was found that such a ring did reduce oil consumption, it was also found that such reduced oil consumption was attended by an increase in blow-by, and hence, reduction in the efficiency of the engine.

The object of the present invention, generally stated, is to provide a tapered face ring whose operation is not attended by an increase in blow-by.

A further object of the present invention is to provide a piston ring of the character referred to which will not only maintain compression at all times during the cycle of operation but also provide a high unit loaded scraping edge.

Other objects will become apparent to those skilled in the art when the following description is read in connection with the accompanying drawings, in which:

Figure 1 is a plan view of a piston ring constructed in accordance with the present invention, shown in its free and unconfined condition;

Figure 2 is a sectional view taken along line 2—2 of Figure 1;

Figure 3 is a detail view illustrating, in exaggerated relation, the position assumed by the piston ring of Figures 1 and 2 when compressed to cylinder size, as in operation;

Figures 4 to 8, inclusive, are views similar to Figure 2 showing the cross-sectional configurations of other piston rings embodying the present invention;

Figure 9 is a view corresponding to Figure 3 and illustrating, in exaggerated relation, the position assumed by the ring of the Figure 6 embodiment, in a piston ring groove when compressed to cylinder diameter, as in operation; and Figure 10 is a diagrammatic view of a piston ring in free condition, showing particularly the directions of measurement in accordance with the present invention.

In accordance with the present invention, generally stated, a piston ring, which is provided with a tapered exterior face and intended to operate in a cylinder with the lower edge of its face in engagement with the cylinder wall, is relieved along its inward-upward diagonal so as to render that diagonal dimension shorter than the dimension along the inward-downward diagonal. Such diagonal relief may be accomplished by removing material either from the upper inside corner of the ring or the lower outside corner of the ring so as to unbalance it to an extent sufficient to offset, and preferably more than offset, the tendency of the relief at the upper outside corner (incidental to tapering the face) to twist the ring. In tapering the face of a piston ring so as, in theory, to provide a scraping edge at the lower corner of the face, the ring section is unbalanced in a direction which tends to twist the piston ring in its groove (when compressed to cylinder size) in such manner that the upper surface thereof engages with the upper side of the ring groove at the back and the lower side thereof engages with the lower side of the ring groove at the outside. This characteristic results in partial or complete nullification of the expected effect of the tapered face.

The present invention contemplates that the above described inherent characteristic of a tapered face ring be at least neutralized and overcome by relieving to a greater extent along the opposite diagonal, and hence creating a condition which will result, when the ring is compressed to cylinder size, in the creation of internal stresses tending to twist the ring in the groove so that the upper side of the ring engages the upper side of the ring groove near its outer corner and the lower side of the ring engages the lower side of the ring groove near its inner corner. Such an arrangement supplements the theoretical effect of the tapered face and provides a piston ring which not only maintains compression but also provides an effective scraping edge. When the expression, "upper side," or synonymous expressions are used herein it will be understood that the side nearest the combustion chamber is intended, and likewise "lower side" means the side remote from the combustion chamber.

Referring now to the drawings for a more detailed disclosure of the present invention, a piston ring 1 of any suitable material having a gap 2 may be formed from any suitable stock or casting. In its free and unconfined condition the ring 1 departs slightly from a true circle as is usually the case with C-type piston rings, but when compressed to cylinder size the gap 2 is reduced and the ring approaches a circular form. Regardless of the initial cross-sectional configuration of the piston ring blank it may be operated upon, as by machining, to provide a cylinder engaging face 3 which departs a few degrees, such as 1½° to 2½°, from normal to the lateral axis of the ring and produce a so-called "tapered face." The tapering is in a direction such as to provide the greater diameter at the lower side of the ring.

Such tapering of the cylinder engaging face of a piston ring as just described is, in accordance with the present invention, supplemented by further relieving the piston ring as, for example, in the embodiment shown in Figure 2, by beveling the inner-upper corner of the ring as shown at 4. The extent of the bevel 4 is sufficient to overcome the inherent tendency of the tapering at 3 to twist the ring in the clockwise direction as seen in Figure 2, and the beveling at 4 may be to an extent sufficient to tend to twist the ring in the counter-clockwise direction as seen in Figure 2.

Such neutralization of the inherent tendency of the tapering at 3 to twist the ring in the clockwise direction, as seen in Figure 2, may be overcome by other forms of relieving, either at the upper edge of the back of the ring or the lower edge of the outer face, and such relief may take the form of a taper, a bevel, a rabbet or otherwise, as shown for example in the other embodiments now to be described.

In Figure 4 the piston ring 1 having a tapered face 3 is relieved at its inside upper corner by a rabbet 5.

Although in most cases it is preferable to relieve the ring at the inner upper corner, Figure 5 shows a variation of the ring shown in Figure 4 wherein the relief is accomplished at the lower corner of the cylinder engaging face by providing a rabbet 6 thereat.

In the embodiment shown in Figure 6 the desired relief to neutralize the twisting effect of the tapered face is provided by beveling the upper side of the ring as shown at 7.

In Figure 7 the relief is accomplished by tapering the back of the ring as shown at 8 to an extent sufficient to provide slightly more relief than is provided by the tapering of face 3.

In Figure 8 a cross-sectional configuration is shown wherein the upper side 9 and the lower side 10 of the piston ring are dipped, with reference to the lateral axis of the ring, so as to converge inwardly. The cylinder engaging face 3 is tapered as in the previous embodiments and the back is tapered as shown at 11. This embodiment represents a compound situation where the relief at 10 supplements the relief at 3 and the relief at 9 and 11 supplement each other, and not only neutralize but overcome the tendency of the reliefs at 3 and 10 to twist the ring in the clockwise direction as seen in Figure 8.

In each of these embodiments the cross-sectional configuration of the final ring is such that the inward-upward diagonal dimension is less than the inward-outward diagonal dimension, as it is only when this condition exists that the internal stresses existing within the body of the ring, when compressed to cylinder wall diameter as in operation, tend to twist it in a direction such that the lower edge of the cylinder engaging face is urged outwardly and the upper edge of the cylinder engaging face is urged inwardly, thus supplementing the theoretical action of the tapered face and at the same time insuring a bearing relation of the ring within the groove so that the lower side of the ring engages the groove near its back while the upper side of the ring engages the groove near its outside. This condition is clearly shown in Figure 3, where the cross-sectional configuration of Figure 2 is utilized for illustration, and in which it will be observed that the upper side 12 of the ring engages the groove at 13 while the lower side 14 of the ring engages the groove at 15. Likewise, by reference to Figure 9 it will be observed that a ring of the configuration shown in Figure 8 has its upper side 9 engaging the groove at 16 while its lower side 10 engages the groove at 17. The result of this arrangement is that when the piston moves downwardly the forces exerted on the ring tend to urge it into closer engagement with the cylinder wall, and similarly, when the piston moves upwardly the forces exerted upon the ring tend to move it into closer engagement with the cylinder wall.

As already pointed out, in each of the embodiments shown in the drawing the upward-inward diagonal dimension is less than the upward-outward diagonal dimension. For the purpose of this invention, and in view of the fact that the cross-sectional configurations in the several embodiments are so irregular and at variance with each other that it may be difficult to ascertain the direction of the diagonals in all cases, reference may be had to Figure 10 which shows, for the purpose of illustration, a piston ring 1 having a cross-sectional configuration according to Figure 8. When such a ring in its free and unconfined condition is laid upon a flat surface the line a—a' represents the upper plane of the body of the ring and the line b—b' represents the lower plane of the body of the ring, it being observed that the length of line b—b' equals the maximum diameter of the body of the ring while the line a—a' is slightly longer than the diameter of the ring at its upper plane due to the tapering of the cylinder engaging faces. The lateral axis of the ring is between and parallel with the lines a—a' and b—b'. Lines a—b and a'—b' are elements of an imaginary near-cylinder which is tangent to the lower corners of the cylinder engaging face of the ring. Likewise, lines c—d and c'—d' are elements of an imaginary near-cylinder which is tangent to the minimum inside diameter of the ring. Consequently the cross-sectional configuration of the ring is bounded by a virtual rectangle, a, b, d, c, and it is along the diagonals of this rectangle that the ring is measured, for the purpose of this invention, in determining the extent of relief along what has hereinbefore been referred to as the upward-inward diagonal (b—c) or the upward-outward diagonal (a—d). While for the purpose of illustration in Figure 10 a ring of the cross-sectional configuration shown in Figure 8 has been utilized, it will be apparent that a similar virtual bounding rectangle may be constructed about the cross-sectional configurations of the other embodiments for the purpose of ascertaining the direction on which to measure the diagonal, such virtual bounding rectangle in all instances having two sides which are parallel with and equal to the maximum radial dimension of the cross-section of the ring and the other two sides parallel with and equal to the maximum axial dimension of the ring, said sides being respectively parallel with and normal to the lateral axis of the free and unconfined ring.

Rings constructed in accordance with the present invention wherein the tapered face is supplemented by relief along the inward-upward diagonal as hereinbefore described have in extensive tests demonstrated themselves to be far superior not only in their ability to control compression but also in their ability to reduce oil consumption over rings which are provided with the tapered face without the neutralizing relief, it being understood that in all such tests the usual complement of piston rings was provided on each piston, comparison being obtained by substituting the rings of the present invention for other rings from time to time between runs. For example, in a typical instance a 75-hour continuous operation at wide open throttle (1900 R. P. M.) was carried out without measurable blow-by and with an oil consumption of .0027 pound per horsepower hour.

Having thus described the invention, the importance thereof will be readily appreciated by those skilled in the art; and while a number of illustrative cross-sectional shapes have been shown in the accompanying drawings it is not to be understood that the invention is limited to those shapes but that the cross-sectional shapes specifically disclosed are merely illustrative of the principle involved. Consequently it is to be understood that such modifications and variations as do not depart from the spirit of this invention are, although not specifically described herein, contemplated by and within the scope of the appended claim.

The invention having thus been described, I claim:

A piston ring comprising an annular member having an axis, the cross section of said member having a radial dimension on the order of twice its axial dimension, said member having an external face entirely out of parallel with the axis and having inwardly converging upper and lower sides, the angular relationship between said face and said sides being nearer to perpendicular at the upper side than at the lower side, and a conical surface at the inside of said member, said surface being inclined with reference to the axis in the opposite sense and in substantially greater degree than said external face.

DALLAS M. SMITH.

REFERENCES CITED

The following references are of record in the file of this patent:

UNITED STATES PATENTS

| Number | Name | Date |
| --- | --- | --- |
| 1,381,993 | Hill et al. | June 21, 1921 |
| 1,735,596 | Bowman | Nov. 12, 1929 |
| 1,919,183 | Paton | July 18, 1933 |
| 2,068,042 | Teetor | Jan. 19, 1937 |
| 2,173,190 | Wilkening | Sept. 19, 1939 |
| 2,299,399 | Lane | Oct. 20, 1942 |

FOREIGN PATENTS

| Number | Country | Date |
| --- | --- | --- |
| 107,080 | Australia | Apr. 20, 1939 |

OTHER REFERENCES

"The Magic Circle," pp. 8, 9, and 10, Nov. 1942, published by "The Perfect Circle Company."

Certificate of Correction

Patent No. 2,459,395.

January 18, 1949.

DALLAS M. SMITH

It is hereby certified that error appears in the printed specification of the above numbered patent requiring correction as follows:

Column 2, line 24, for "its face" read *its exterior face*;

and that the said Letters Patent should be read with this correction therein that the same may conform to the record of the case in the Patent Office.

Signed and sealed this 5th day of July, A. D. 1949.

[SEAL]

THOMAS F. MURPHY,
*Assistant Commissioner of Patents.*